US011030428B2

(12) United States Patent
Boehm et al.

(10) Patent No.: US 11,030,428 B2
(45) Date of Patent: Jun. 8, 2021

(54) SYSTEMS AND METHODS FOR UNIVERSAL TOLL MODULE

(71) Applicant: Gentex Corporation, Zeeland, MI (US)

(72) Inventors: Neil J. Boehm, Allegan, MI (US); Marc A. Smeyers, Zeeland, MI (US); Steven L. Geerlings, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 533 days.

(21) Appl. No.: 15/625,732

(22) Filed: Jun. 16, 2017

(65) Prior Publication Data

US 2017/0364719 A1    Dec. 21, 2017

Related U.S. Application Data

(60) Provisional application No. 62/351,357, filed on Jun. 17, 2016.

(51) Int. Cl.
*G06K 7/10*     (2006.01)
*G07B 15/06*    (2011.01)

(52) U.S. Cl.
CPC ........ *G06K 7/10366* (2013.01); *G07B 15/063* (2013.01); *G06Q 2240/00* (2013.01)

(58) Field of Classification Search
CPC ........... G06K 7/10366; G06Q 2240/00; G07B 15/063
See application file for complete search history.

(56) References Cited

U.S. PATENT DOCUMENTS

| | | | | | |
|---|---|---|---|---|---|
| 5,376,943 | A | * | 12/1994 | Blunden | G08G 1/017 343/702 |
| 5,661,804 | A | * | 8/1997 | Dykema | G07C 9/00182 380/262 |
| 5,903,226 | A | * | 5/1999 | Suman | G07C 9/00182 340/12.28 |
| 6,124,886 | A | * | 9/2000 | DeLine | B60Q 3/258 348/148 |
| 6,158,655 | A | * | 12/2000 | DeVries, Jr. | B60R 1/12 235/380 |

(Continued)

FOREIGN PATENT DOCUMENTS

| | | |
|---|---|---|
| EP | 0 425 961 A2 | 5/1991 |
| JP | 2004-271474 A | 9/2004 |

(Continued)

OTHER PUBLICATIONS

Rakhi Kalantri, "RFID Based Toll Collection System", International Journal of Computer Science and Information Technologies, vol. 5, 2014, all pages (Year: 2014).*

(Continued)

*Primary Examiner* — Omar Zeroual
(74) *Attorney, Agent, or Firm* — Price Heneveld LLP; Bradley D. Johnson

(57) ABSTRACT

A system includes a communication device and a user interface. The communication device includes a universal toll module configured to transmit a toll signal that includes at least one electronic toll code to be communicated to an electronic toll system. The universal toll module is communicatively coupled to a vehicle bus of the vehicle. The user interface is communicatively coupled to the vehicle bus.

8 Claims, 4 Drawing Sheets

(56) References Cited

U.S. PATENT DOCUMENTS

| | | | | |
|---|---|---|---|---|
| 6,172,613 B1* | 1/2001 | DeLine | | B60K 35/00 340/815.4 |
| 6,445,287 B1* | 9/2002 | Schofield | | B60C 23/0401 340/442 |
| 6,690,268 B2* | 2/2004 | Schofield | | B60R 1/04 340/438 |
| 7,970,446 B2* | 6/2011 | Witkowski | | H04B 7/2609 455/575.9 |
| 8,218,608 B2* | 7/2012 | Nantz | | H03J 1/0025 375/219 |
| 8,311,559 B1* | 11/2012 | Morrow | | G07B 15/063 455/456.1 |
| 8,536,977 B2* | 9/2013 | Fitzgibbon | | G07C 9/00309 340/5.23 |
| 8,948,727 B2* | 2/2015 | Tang | | H04W 12/08 455/411 |
| 9,064,358 B2* | 6/2015 | Lidror | | G07C 1/30 |
| 9,688,202 B2* | 6/2017 | Nyalamadugu | | B60R 1/12 |
| 9,836,740 B1* | 12/2017 | Geist | | G06Q 20/3278 |
| 9,911,169 B1* | 3/2018 | Geist | | G06Q 20/20 |
| 10,121,289 B1* | 11/2018 | Gravelle | | G07B 15/063 |
| 2001/0055165 A1* | 12/2001 | McCarthy | | G06Q 20/327 359/839 |
| 2002/0014973 A1* | 2/2002 | Drummond | | B60R 11/04 340/815.4 |
| 2002/0159270 A1* | 10/2002 | Lynam | | B60Q 1/2665 362/492 |
| 2003/0169522 A1* | 9/2003 | Schofield | | H04N 5/23238 359/876 |
| 2003/0184065 A1* | 10/2003 | Breed | | B60N 2/002 280/735 |
| 2004/0008410 A1* | 1/2004 | Stam | | H01L 27/14621 359/443 |
| 2004/0110472 A1* | 6/2004 | Witkowski | | H04L 12/66 455/41.2 |
| 2004/0167861 A1* | 8/2004 | Hedley | | G06K 9/00624 705/400 |
| 2004/0184282 A1* | 9/2004 | Nishijima | | B60R 1/12 362/516 |
| 2004/0203379 A1* | 10/2004 | Witkowski | | H04L 12/66 455/41.2 |
| 2004/0246607 A1* | 12/2004 | Watson | | B60R 1/12 359/872 |
| 2005/0270621 A1* | 12/2005 | Bauer | | B60R 1/088 359/265 |
| 2006/0015394 A1* | 1/2006 | Sorensen | | G06Q 40/00 705/13 |
| 2007/0285256 A1* | 12/2007 | Batra | | G08B 13/2462 340/572.8 |
| 2008/0291047 A1* | 11/2008 | Summerford | | G07C 9/00182 340/5.71 |
| 2010/0085213 A1* | 4/2010 | Turnock | | G07B 15/063 340/928 |
| 2010/0153192 A1* | 6/2010 | Hamilton, II | | G06Q 10/02 705/13 |
| 2010/0156670 A1* | 6/2010 | Hamilton, II | | G08G 1/096741 340/928 |
| 2010/0159846 A1* | 6/2010 | Witkowski | | G07C 9/00857 455/70 |
| 2010/0161392 A1* | 6/2010 | Ashby | | G06Q 30/0284 705/13 |
| 2010/0176915 A1* | 7/2010 | Hayes | | G08C 17/02 340/5.2 |
| 2010/0201896 A1* | 8/2010 | Ostreko | | B60R 1/12 349/1 |
| 2010/0210220 A1* | 8/2010 | Chutorash | | G07C 9/00817 455/68 |
| 2010/0280956 A1* | 11/2010 | Chutorash | | G06Q 20/20 705/64 |
| 2010/0289618 A1* | 11/2010 | Crucs | | G08C 17/00 340/5.61 |
| 2011/0018694 A1* | 1/2011 | Geerlings | | G08C 17/02 340/12.28 |
| 2011/0202393 A1* | 8/2011 | DeWakar | | G06Q 20/3278 705/13 |
| 2011/0208568 A1* | 8/2011 | Deitiker | | G07B 15/063 705/13 |
| 2011/0282717 A1* | 11/2011 | Aschenbrenner | | G07B 15/063 705/13 |
| 2011/0296027 A1* | 12/2011 | Salmela | | H04W 8/08 709/226 |
| 2011/0311052 A1* | 12/2011 | Myers | | G07C 9/20 380/270 |
| 2012/0112882 A1* | 5/2012 | Martinez de Velasco Cortina | | G06K 19/10 340/5.74 |
| 2012/0126942 A1* | 5/2012 | Geerlings | | G08C 17/02 340/5.61 |
| 2012/0143403 A1* | 6/2012 | Cho | | B60R 1/12 701/2 |
| 2012/0232964 A1* | 9/2012 | Brands | | G07B 15/063 705/13 |
| 2012/0313744 A1* | 12/2012 | Vuyst | | H04L 12/2818 340/4.3 |
| 2013/0006724 A1* | 1/2013 | Simanek | | G06Q 30/0251 705/13 |
| 2013/0106622 A1* | 5/2013 | Paul | | G08G 1/0116 340/933 |
| 2014/0025444 A1* | 1/2014 | Willis | | G06Q 20/3272 705/13 |
| 2014/0085110 A1* | 3/2014 | Scofield | | G07B 15/04 340/932.2 |
| 2014/0111315 A1* | 4/2014 | Geerlings | | G08C 17/02 340/12.5 |
| 2014/0180773 A1* | 6/2014 | Zafiroglu | | G07B 15/063 705/13 |
| 2014/0278841 A1* | 9/2014 | Natinsky | | G07B 15/063 705/13 |
| 2014/0300457 A1* | 10/2014 | Geerlings | | G07C 9/00896 340/438 |
| 2014/0313057 A1* | 10/2014 | Kokal | | G06K 9/00838 340/928 |
| 2014/0313563 A1* | 10/2014 | Uken | | B60R 1/088 359/267 |
| 2015/0002262 A1* | 1/2015 | Geerlings | | G07C 9/00309 340/5.25 |
| 2015/0048159 A1* | 2/2015 | Martinez de Velasco Cortina | | G06Q 20/3278 235/379 |
| 2015/0058100 A1* | 2/2015 | Spinelli | | G07B 15/063 705/13 |
| 2015/0088617 A1* | 3/2015 | Geist | | G06Q 20/26 705/13 |
| 2015/0088618 A1 | 3/2015 | Basir et al. | | |
| 2015/0100394 A1* | 4/2015 | Povolny | | G06K 9/78 705/13 |
| 2015/0134428 A1* | 5/2015 | Li | | G07B 15/063 705/13 |
| 2015/0220916 A1 | 8/2015 | Prakash et al. | | |
| 2015/0228139 A1* | 8/2015 | Geerlings | | G07C 9/00857 340/5.61 |
| 2015/0294210 A1* | 10/2015 | Martinez de Velasco Cortina | | G06K 19/0723 235/492 |
| 2015/0302733 A1* | 10/2015 | Witkowski | | G08C 17/02 340/5.25 |
| 2015/0302738 A1* | 10/2015 | Geerlings | | G07C 9/00571 340/5.25 |
| 2015/0317842 A1* | 11/2015 | Evans | | G06Q 20/32 705/13 |
| 2015/0379782 A1* | 12/2015 | Nakagawa | | G07B 15/063 705/13 |
| 2016/0150066 A1* | 5/2016 | Yae | | H04L 67/16 455/41.2 |
| 2016/0171787 A1* | 6/2016 | Yohalashet | | G07B 15/063 705/13 |

(56) References Cited

U.S. PATENT DOCUMENTS

| | | | |
|---|---|---|---|
| 2016/0180604 A1* | 6/2016 | Wilson | G07B 15/063 |
| | | | 705/4 |
| 2016/0183653 A1* | 6/2016 | Warther | A45C 13/42 |
| | | | 340/10.51 |
| 2016/0255459 A1* | 9/2016 | Sarkar | H04W 12/35 |
| | | | 455/41.1 |
| 2016/0267781 A1* | 9/2016 | Papay | G08C 17/02 |
| 2016/0321479 A1* | 11/2016 | Uhl | G06K 7/10336 |
| 2017/0088056 A1* | 3/2017 | Padilla Haro | G07C 1/30 |
| 2017/0127230 A1* | 5/2017 | Enriquez | H04W 4/44 |
| 2017/0178416 A1* | 6/2017 | Barreira Avegliano | |
| | | | G07B 15/06 |
| 2017/0249635 A1* | 8/2017 | Baur | G06Q 20/3278 |
| 2018/0182240 A1* | 6/2018 | Baranga | H04W 4/44 |
| 2019/0012657 A1* | 1/2019 | Geist | G08G 1/017 |

FOREIGN PATENT DOCUMENTS

| | | |
|---|---|---|
| KR | 2009/0102531 A | 9/2009 |
| WO | WO-98/16905 A1 | 4/1998 |
| WO | 2014085617 A1 | 6/2014 |

OTHER PUBLICATIONS

Michael Preziosi, "Behavioral investigation on the factors that determine adoption of an electronic toll collection system: passenger car users", published by Transportation Research Part C, 2011, all pages (Year: 2011).*

International Search Report and Written Opinion of the International Searching Authority in corresponding International Application No. PCT/US2017/037959 dated Oct. 12, 2017, 7 pages.

* cited by examiner

SYSTEMS AND METHODS FOR UNIVERSAL TOLL MODULE

CROSS REFERENCES TO RELATED APPLICATIONS

This applications claim benefit and priority to U.S. Patent Application No. 62/351,357, titled "SYSTEMS AND METHODS FOR UNIVERSAL TOLL MODULE", filed Jun. 17, 2016, which is hereby incorporated by reference in its entirety.

FIELD

The present disclosure relates generally to the field of wireless control systems for a vehicle for transmitting activation signals to remote electronic systems.

BACKGROUND

Vehicles can be provided with electronic toll tags that interact with electronic toll systems, such as electronic toll systems that can receive a signal from the electronic toll tag and approve a vehicle to pass through a toll gate on a highway or other road. However, conventional electronic toll tags can experience less than optimal performance, due to interference created by the vehicle environment. For example, electromagnetic interference may occur if there are multiple electronic tags in the vehicle environment because of different protocols operating at the similar frequencies. In addition, it can be difficult for a user or vehicle occupant to easily interact with or modify conventional electronic toll tags and/or electronic toll systems. Such conventional electronic toll tags can be disadvantageously isolated from other systems within the vehicle.

SUMMARY

One embodiment relates to a system that comprises a communication device configured to be mounted to a vehicle and communicatively coupled to a vehicle bus of the vehicle. The communication device comprises a universal toll module that is configured to transmit a toll signal comprising at least one electronic toll code to an electronic toll system. The system further comprises a user interface configured to be located in an interior of the vehicle and communicatively coupled to the vehicle bus. The user interface is configured to display at least one of an indication of the electronic toll code or identification information corresponding to the communication device.

Another embodiment relates to a communication device comprising a transceiver module configured to transmit a wireless signal to control operation of a remote electronic system, and a universal toll module configured to transmit a toll signal comprising at least one electronic toll code to an electronic toll system. The communication device further comprises at least one of (i) a housing containing the transceiver module and the universal toll module, and/or (ii) a printed circuit board on which both the transceiver module and the universal toll module are mounted.

Another embodiment relates to a method. The method includes receiving an output signal at a universal toll module from an electronic toll system. The universal toll module is mounted to a vehicle and communicatively coupled to a vehicle bus of the vehicle. The method includes selecting an electronic toll code based on the output signal. The method includes formatting a toll signal based on the electronic toll code. The method includes transmitting the toll signal to the electronic toll system. The method includes displaying at least one of an indication of the electronic toll code or identification information corresponding to the universal toll module is displayed to a vehicle occupant.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
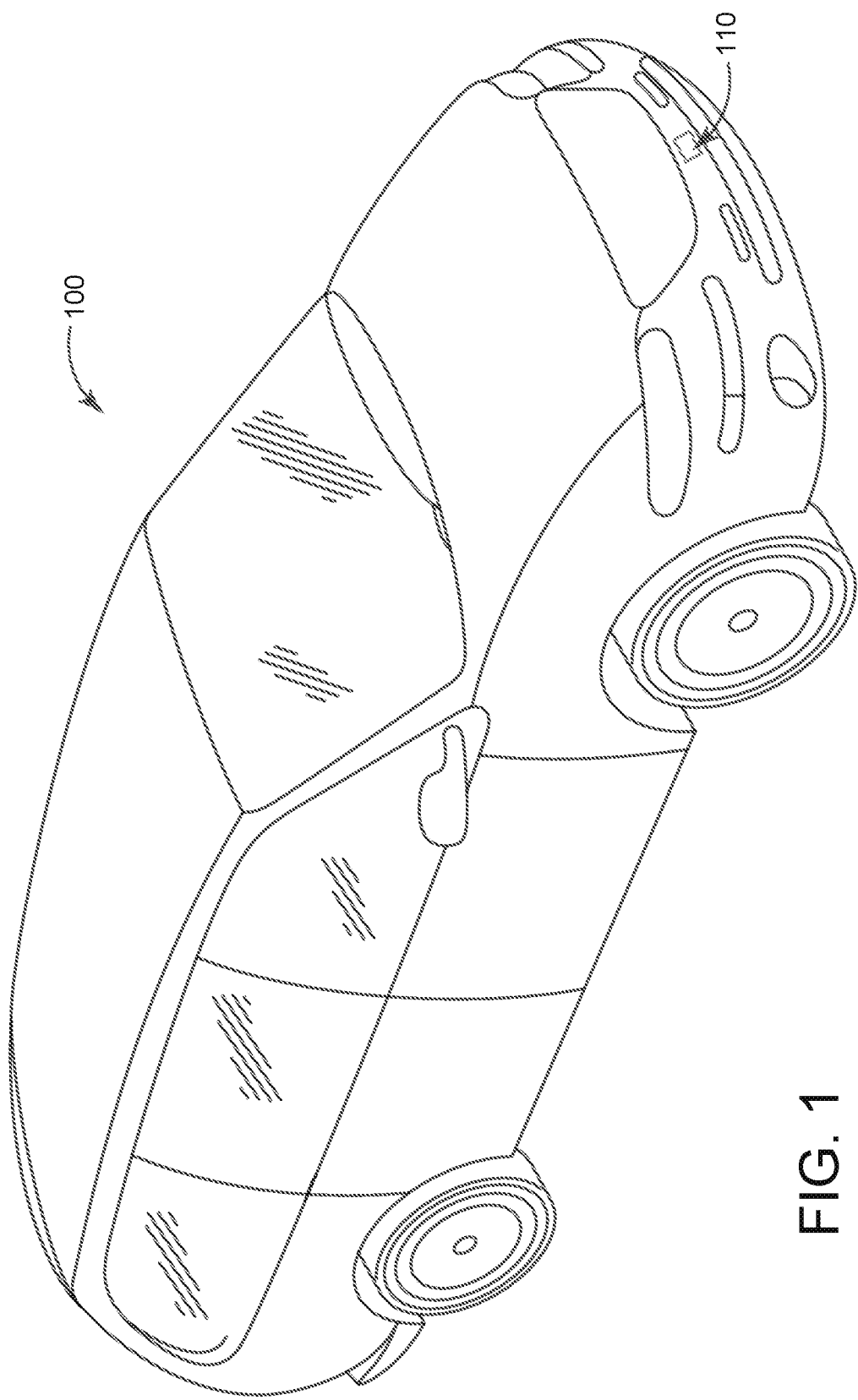
FIG. 1 illustrates a vehicle with a communication device, according to an exemplary embodiment.

Referring to the FIGURES generally, a system (e.g., a vehicle wireless control system) for a vehicle can include a communication device, which includes a universal toll module, and a user interface. In a more preferred configuration, the system can also include a transceiver module. FIG. 1 shows a perspective view of an embodiment of such a vehicle 100 with a communication device 110.

Communication Device

Universal Toll Module

The communication device of the system can include the universal toll module. The universal toll module can be configured to transmit a toll signal, which comprises at least one electronic toll code, to an electronic toll system. The electronic toll code can be or include an indication of a serial number of the universal toll module, an identification code associated with the universal toll module (e.g., an identification code corresponding to a purchaser of the universal toll module, a subscriber of a toll pass system, such as a toll pass system administered by a transportation authority, an account for payment of tolls to the electronic toll system), or any other identification code required by an electronic toll system for authorizing a vehicle to pass through a toll gate or for determining a toll fee to be charged by the electronic toll system.

In some embodiments, the communication device can be communicatively coupled to a vehicle bus (e.g., a CAN bus, a LIN bus).

Transceiver Module

In a preferred embodiment, the system also can include a transceiver module configured to generate and transmit control signals configured to activate a remote system (e.g., a garage door opener, a security gate opener, a home lighting system, a home security system, etc.). Preferably the transceiver module is part of the communication device, but it conceivably could be separate from the communication device.

The transceiver module preferably is configured to be trainable and "learn" the characteristics of multiple activation signals generated by multiple original transmitters (e.g., an original transmitter for a garage door opener, a security gate opener, a home lighting system, a home security system, etc.) and store one or more characteristics of the activation signal in a local memory for use in subsequent transmissions of activation signals formatted to control the remote electronic systems associated with the original transmitter. The transceiver module can reproduce a modified activation signal upon receiving a user input (e.g. via a push button, a voice command, etc.) and may transmit the activation signal formatted to control the remote electronic system (e.g., formatted to cause a garage door open to change state upon receipt).

In some embodiments, the transceiver module can be communicatively coupled to the vehicle bus (e.g., a CAN bus, a LIN bus).

Configuration and Location of the Communication Device

In some embodiments, the communication device includes a housing containing the components of the communication device, such as a housing containing the universal toll module. The housing can be water-proof and/or otherwise sealed to protect the electronic components within the housing from environmental damage, including temperatures outside of an operating temperature range of the electronic components. The housing may contain only the universal toll module or may additionally contain the transceiver module. In some embodiments, the universal toll module and the transceiver module may be provided on the same printed circuit board.

The communication device can be integrated within various components of the vehicle. For example, the communication device can be configured to be mounted at least partially within an interior component in the interior of the vehicle. For example, the interior component could be a rear view mirror assembly, an instrument panel, or a headliner. The communication device alternatively can be configured to be mounted at least partially within an exterior component on the exterior of the vehicle. For example the exterior component can be a front or rear bumper, an exterior vehicle panel (e.g., a quarter panel, hood, trunk lid, or roof), or a windshield.

Locating the communication device on the exterior of the vehicle may reduce interference between the communication device (and any transceiver circuits/antennas contained therein) and a remote electronic system, such as an electronic toll system, or another remote device. For example, if the windshield of the vehicle includes glass that can interfere with radio frequency (RF) transmissions, such as metallized glass, locating the communication device with the universal toll module outside the vehicle provides a line of sight for RF transmission from the universal toll module to the electronic toll system outside of the space occupied by the metallized glass in which interference could occur.

Advantageously, by integrating the transceiver module and the universal toll module with functionalities detailed below, the communication device may eliminate interference in RF transmissions. Various electronic toll systems may operate in different geographical regions from one another and may communicate in different protocols (e.g., InterAgency Group (IAG) protocol, FasTrak protocol, TxTag protocol, SunPass protocol, etc.) but at the same frequency (e.g., 915 MHz). Furthermore, some electronic toll systems may operate with passive electronic toll tags and may rely on modulated backscatter. Other electronic toll systems may operate with active electronic toll tags connected to a power source and may expect receipt of an expected signal from the electronic tag. When both types of electronics tags are present in the vehicle, the electronic toll tags may interfere with the RF transmissions of one another, resulting in the electronic toll system receiving signals from none of these tags or two or more of such tags. Integrating the transceiver module with the universal toll module that may selectively format and transmit toll signals based on the signal from the electronic toll system may thus alleviate or eliminate such interference due to RF signals. The integration of the communication system with the vehicle in the manner described herein may also reduce interference from other components within the vehicle.

User Interface

The user interface can include a user input device for receiving user inputs corresponding to commands for controlling operation of the vehicle wireless control system. For example, the vehicle wireless control system can receive user inputs indicating commands associated with interactions with electronic toll systems, such as user inputs indicating (i) a request to transmit a signal to the electronic control system, (ii) an electronic toll code to be utilized, (iii) the identity of electronic toll system, and/or (iv) a number of passengers in the vehicle as required for entering or determining toll fees for HOT/HOV lanes. As a further example, the user input device could receive user inputs corresponding to commands that cause the transceiver module to control a remote device.

In some embodiments, the user interface can include a user output device to output information to a user. For example, the user output device can indicate to a vehicle occupant an indication of the serial code. In some embodiments, the serial code includes subserial codes associated with different electronic toll systems (e.g., electronic toll systems having different or heterogeneous toll protocols). The user output device also may output to a user an indication of the electronic toll code or the authorization by the electronic toll system, such as by displaying a serial number or code of the universal toll module, or outputting by an audio output device a noise indicating the authorization. As a further example, the user output device can output to a vehicle occupant an indication that transit through a gate controlled by the electronic toll system is authorized, such as by providing a visual/and or audio output. As a still further example, the user output device can output to a vehicle occupant an indication of the status of a remote device that is controlled by the transceiver module.

In some embodiments, the user interface can be communicatively coupled to the vehicle bus (e.g., a CAN bus, a LIN bus).

Preferred Implementations

Figure 2:
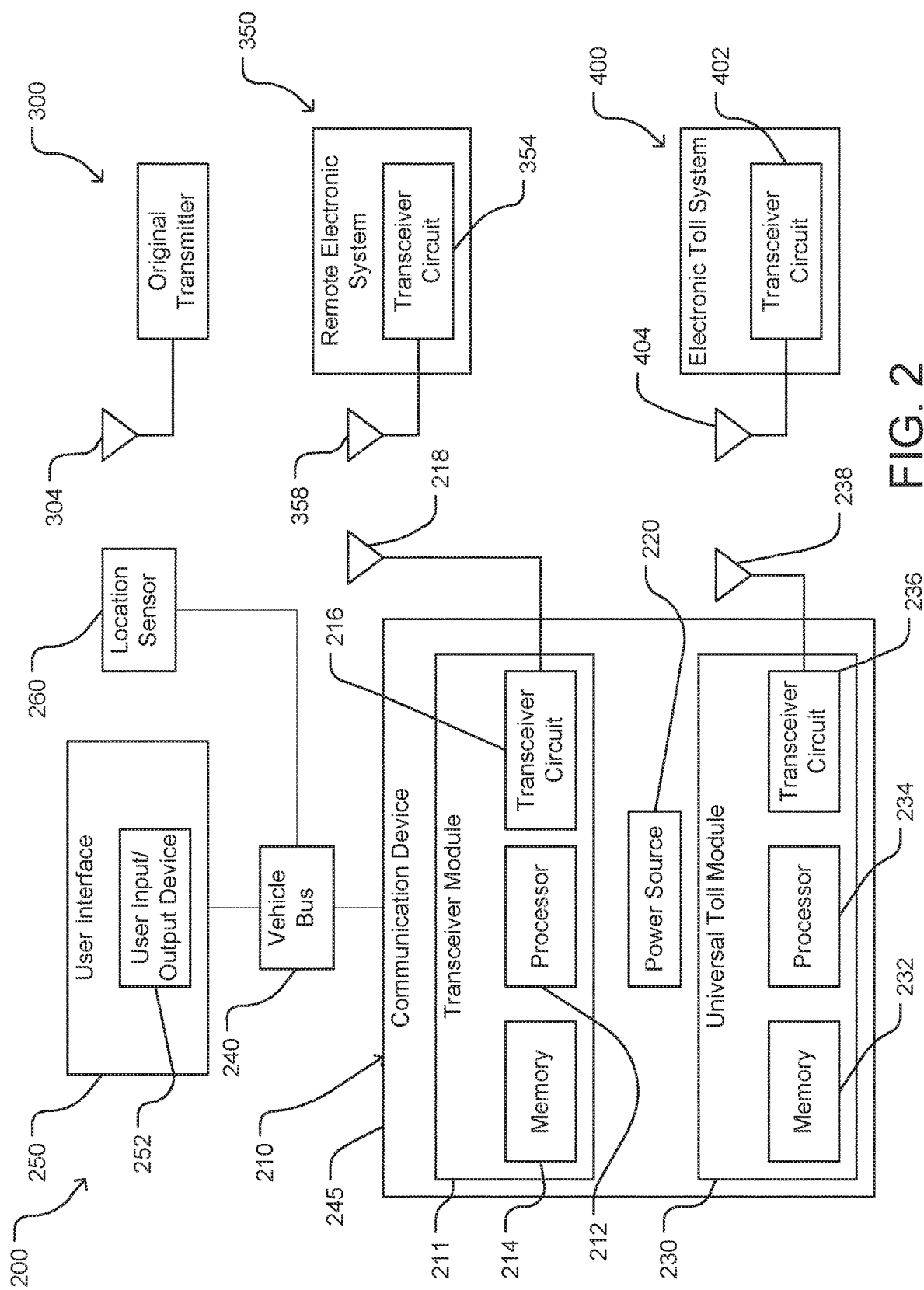
FIG. 2 is a schematic diagram of a system including a universal toll module for communicating with electronic toll systems, according to an exemplary embodiment.

Referring to FIG. 2, a block diagram of a system 200 (e.g., a vehicle wireless control system) is shown. In some embodiments, components of the vehicle wireless control system 200 are configured to communicate with remote devices such as an original transmitter 300, a remote electronic system 350, and/or an electronic toll system 400. The vehicle wireless control system 200 preferably includes a communication device 210. The communication device 210 can be similar to the communication device 110 as described with regard to FIG. 1. The communication device 210 can be mounted to an exterior of a vehicle (e.g., vehicle 100 shown in FIG. 1), or at other locations in or on the vehicle as previously described. The communication device 210 can include a housing 245 containing the components of the communication device 210. The housing 245 can be mounted to an exterior of a vehicle. The housing 245 can be water-proof and/or otherwise sealed to protect electronic components enclosed or contained within the housing 245 from environmental damage, including temperatures outside of an operating temperature range of the electronic components.

The communication device 210 can include a universal toll module 230. The universal toll module 230 can be configured to transmit at least one toll signal to an electronic toll system 400. The electronic toll system 400 can be any system configured to authorize a vehicle to pass through a location, including gated or ungated toll roads. The electronic toll system 400 can be configured to receive a toll signal transmitted by the communication device 210 and perform an action based on the toll signal, such as authorizing a vehicle 100 (that the communication device 210 is mounted to) to pass through the electronic toll system 400, charging a toll fee to an account associated with the communication device 210 or indicated by the toll signal, etc. The electronic toll system 400 can include a transceiver circuit 402 (e.g., a transceiver circuit 402 that uses antenna 404 to transmit and receive wireless signals). The electronic toll system 400 can be configured to transmit an output signal that can include identification information associated with the electronic toll system 400.

In some embodiments, the universal toll module 230 can include a memory 232, which can store the at least one electronic toll code, a frequency or frequency range expected for transmission of toll signals to the electronic toll system 400, etc. Memory 232 may include one or more devices (e.g., RAM, ROM, Flash® memory, hard disk storage, etc.) for storing data and/or computer code for completing and/or facilitating the various processes, layers, and modules described in the present disclosure. Memory 232 may include volatile memory or non-volatile memory. Memory 232 may include database components, object code components, script components, or any other type of information structure for supporting the various activities and information structures described in the present disclosure. Memory 232 may be communicably connected to a processor 234 and include computer code (e.g., data modules stored in memory 232) for executing one or more control processes described herein.

In some embodiments, the universal toll module 230 includes the processor 234. The processor 234 can be configured to retrieve information from and store information in the memory 232, such as for retrieving and storing electronic toll codes, including for generating toll signals based on the electronic toll codes. The processor 234 can be configured to execute programs stored in the memory 232. The processor 234 can be implemented as a general purpose processor, a microprocessor, a microcontroller, an application specific integrated circuit (ASIC), one or more field programmable gate arrays (FPGAs), a CPU, a GPU, a group of processing components, or other suitable electronic processing components.

In some embodiments, the universal toll module 230 includes a transceiver circuit 236. The transceiver circuit 236 can send and receive electromagnetic signals using antenna 238 (e.g., RF signals, etc.). The transceiver circuit 236 can be configured to receive signals from remote sources, such as output signals from the electronic toll system 400 that provide power to the universal toll module 230 and/or identify the electronic toll system 400 to the universal toll module 230. The transceiver circuit 236 can be configured to transmit signals to remote sources, such as to transmit a toll signal indicating an electronic toll code corresponding to the electronic toll system 400. For example, the universal toll module 230 can enter a transmission range of the electronic toll system 400, receive an output signal from the electronic toll system 400, power up the processor 234 using the energy from the output signal of the electronic toll system 400, retrieve an electronic toll code by the processor 234 from the memory 232, the electronic toll code corresponding to the electronic toll system 400, generate a toll signal based on the electronic toll code, and transmit the toll signal by the transceiver circuit 236 to the electronic toll system 400. In some embodiments, the universal toll module 230 is configured to transmit the toll signal in response to receiving the output signal from the electronic toll system 400, such as by automatically transmitting the toll signal.

In some embodiments, the communication device 210 includes a transceiver module 211 that can be configured to wirelessly transmit an activation signal to control operation of a remote electronic system (e.g., remote electronic system 350). The remote electronic system 350 can be one of any number of electronic systems configured to receive wireless control signals from the communication device 210. In some embodiments, remote electronic system 350 is configured to control operation of a garage door attached to a garage. In other embodiments, the remote electronic system 350 may be a home lighting system, a home security system, a data network (e.g., using ASK, using OOF, using FSK, LAN, WAN, cellular, etc.), a HVAC system, or any other remote electronic system capable of receiving control signals from the communication device 210. The remote electronic system can include a transceiver circuit 354 for sending and/or receiving wireless signals (e.g., using antenna 358).

The transceiver module 211 may, in certain embodiments, include a transceiver circuit 216, a processor 212, and a memory 214. The processor 212 and memory 214 can be similar to the processor 234 and memory 232 of the universal toll module 230. The processor 212 can be configured to retrieve information for generating an activation signal stored in the memory 214, generate or format the activation signal based on the information stored in the memory 214, and cause the transceiver circuit 216 to transmit the activation signal.

The transceiver module 211 can be configured to wirelessly communicate with the original transmitter 300. The original transmitter can be a remote or hand-held transmitter, which may be sold with remote electronic system 350 or as an after-market item. The original transmitter 300 can be configured to transmit an activation signal at a predetermined carrier frequency and having control data configured to actuate remote electronic system 350. For example, the original transmitter may be a hand-held garage door opener transmitter configured to transmit a garage door opener signal at a frequency (e.g., centered around 315 MHz or 355 MHz, etc.). The activation signal may include control data, which can be a fixed code, a rolling code, or another cryptographically-encoded code. The remote electronic system 350 can be configured to open a garage door, for example, in response to receiving the activation signal from the original transmitter 300.

The transceiver module 211 can be configured to configured to identify and store one or more characteristics of the activation signal (e.g., signal frequency, control data, modulation scheme, etc.) from the original transmitter 300 or from another source. In some embodiments, the transceiver module 211 is configured to learn at least one characteristic of the activation signal by receiving the activation signal, determining the frequency of the activation signal, and/or demodulating the control data from the activation signal. For example, the transceiver module 211 can be configured to extract control information from a control signal for controlling the remote electronic system 350 received by the transceiver circuit 216 from a transmitter (e.g., original transmitter 300), format the activation signal based on the control information, and cause the transceiver circuit 216 to transmit the activation signal to the remote electronic system 350.

Additionally, the transceiver module 211 can receive one or more characteristics of the activation signal by other methods of learning. For example, the one or more characteristics of the activation signal can be preprogrammed into memory 214 during manufacture of communication device 210, input via user input devices 252, or learned via a "guess and test" method. These additional sources of activation signal characteristics may be used to supplement the characteristics of the activation signal learned from receiving the activation signal from the original transmitter 300. The communication device 210 can store the characteristics of the activation signal in memory 214.

While the universal toll module 230 and the transceiver module 211 are shown for illustrative purposes in FIG. 2 as having different or separate processors, memory, and transceiver circuits, it is understood that the desired functionality of both the universal toll module 230 and the transceiver module 211 could be provided by a shared processor, memory, and/or transceiver circuit or that additional processors, memory, and transceiver circuits could be utilized. In some embodiments, the communication device 210 includes a printed circuit board on which both the transceiver module 211 and the universal toll module 230 are mounted.

In some embodiments, the communication device 210 includes a power source 220. The power source 220 can provide power to various components of the communication device 210, including the universal toll module 230 and the transceiver module 211. The power source 220 can be a battery contained within the housing of the communication device 210 or another power source provided by the vehicle. In some embodiments, the universal toll module 230 can receive an output signal from the electronic toll system 400 that provides a threshold power to the universal toll module 230 so that the universal toll module 230 can transmit a toll signal.

In some embodiments, the vehicle wireless control system 200 includes a user interface 250. The user interface 250 can be configured to receive user inputs from a vehicle occupant and output information to the vehicle occupant. The user interface 250 can be located in or mounted to a rearview mirror assembly, a center stack of the vehicle 100, or in other locations in the interior of the vehicle 100 allowing for access by a vehicle occupant. The user interface 250 can include a user input/output device 252. The user input/output device 252 can include user input devices such as button, switches, touchscreens, etc., for receiving a user input from a vehicle occupant. In some embodiments, the communication device 210 receives the user input and can process the user input to determine an action to take based on the user input, such as causing transmission of a toll signal to the electronic toll system 400 or transmission of an activation signal to the remote electronic system 350.

The communication device 210, the universal toll module, the transceiver module 211, and/or components thereof may be communicatively coupled to the user interface 250 via a vehicle bus 240, allowing for commands, user inputs, and outputs from and to vehicle occupants to be transmitted between the communication device 210, the universal toll module, the transceiver module 211, and/or components thereof and the use interface 250. The vehicle bus 240 can be, for example, a CAN bus or a LIN bus. In some embodiments, connecting the communication device 210 via the vehicle bus 240 reduces the energy demand of the communication device 210 on the power source 220 (e.g., demand for energy that would otherwise be required to transmit signals between the user interface 250 and the communication device 210), reducing the need for a user to replace the power source 220 in the communication device 210.

In some embodiments, the processor 212 receives the user input, and processes the user input to determine whether to further transmit the user input to the universal toll module 230. In some embodiments, the universal toll module 230 is directly connected to the user interface 250 via the vehicle bus 240, and electronics of the user interface 250 transmit the user input in a format configured for reception by the universal toll module 230.

In some embodiments, the user input indicates the electronic toll code. For example, the user input can be a serial number of the universal toll module 230. The user input can be an account number associated with the universal toll module 230 or with an account corresponding to a regional toll system.

In some embodiments, the user input indicates instructions to transmit a toll signal or other activation signal. In some embodiments, the user input indicates a number of vehicle occupants in the vehicle. For example, if the electronic toll system 400 is associated with an HOT/HOV lane system (e.g., a system that authorizes access based on the vehicle having multiple vehicle occupants, a system that charges toll fees based on the number of vehicle occupants, etc.), the user input can indicate the number of vehicle occupants to the electronic toll system 400.

In some embodiments, the user input indicates the electronic toll system 400 (or a selection thereof). For example, if the universal toll module 230 is configured to store multiple electronic toll codes corresponding to multiple electronic toll systems (e.g., heterogeneous and/or regional electronic toll systems), the user input can indicate a selection of the electronic toll system 400 that the vehicle is currently seeking authorization to pass through. The universal toll module 230 (or the processor 212, if the transceiver circuit 216 is to be used to transmit a signal to the electronic toll system 400) can be configured to select the electronic toll code for formatting of the toll signal for transmission by the transceiver circuit 236 to the electronic toll system 400. The user input can indicate a current location of the vehicle 100, and the vehicle wireless control system 200 can determine the corresponding electronic toll system 400 based on the current location (e.g., by performing a lookup in a database mapping geographic locations to electronic toll systems to determine the appropriate electronic toll system).

In some embodiments, the user input/output device 252 can include output devices for outputting information to a vehicle occupant. For example, the user input/output device 252 can include a display for displaying images to a user, such as for displaying a serial number of the universal toll module. The user input/output device 252 can include an audio output device (e.g., speakers) configured to output audio to a vehicle occupant, such as an audio output indicating transmission of a toll signal or activation signal by the communication device, or an audio output indicating a status of authorization by the electronic toll system 400 (e.g., an audio output indicating that the electronic toll system 400 has authorized the vehicle 100 to pass through a gate). The user input/output device 252 can output information to a vehicle occupant in response to a request received from the vehicle occupant as user input. For example, the user interface 250 can include or be operatively coupled to processing electronics (not shown) configured to process user inputs and generate user outputs based on the user inputs.

In some embodiments, the vehicle wireless control system 200 can receive an acknowledgment or status signal from the electronic toll system 400. The status signal can indicate a status of authorization by the electronic toll system 400 based on the toll signal transmitted by the vehicle wireless control system 200. For example, the status signal can indicate that the toll signal is received, that authorization is pending, approved, or denied, that a toll fee transaction is pending, approved, or denied, a status of an account (e.g., a payment account) associated with the toll signal, etc.

In some embodiments, the vehicle wireless control system 200 includes a location sensor 260. The location sensor 260 can be or include a global positioning system (GPS) receiver. The GPS receiver may receive location information from a GPS. For example, the GPS receiver can receive the latitude and/or longitude of the vehicle wireless control system 200 from the GPS. While FIG. 2 illustrates the location sensor 260 communicatively coupled to the user interface 250 and communication device 210 via the vehicle bus 240, in some embodiments, the location sensor 260 can be included in the communication device 210 or can be coupled to the communication device 210 via the user interface 250.

In some embodiments, the communication device 210 can be configured to transmit toll signals or other activation signals based on location information received from the location sensor 260. For example, the location information can indicate proximity to the electronic toll system 400 (or to the remote electronic system 350), and the communication device 210 can transmit the toll signal to the electronic toll system 400 based on the location information. In some embodiments, the communication device 210 can automatically transmit the toll signal in response to determining that the location information indicates proximity to the electronic toll system 400. In some embodiments, the communication device 210 can select the electronic toll code corresponding to the electronic toll system 400 based on the location information, such as by performing a lookup in a database (e.g., a database in memory 214 or memory 232) mapping location information to electronic toll codes and/or electronic toll systems in order to retrieve the appropriate electronic toll code.

Figure 3:
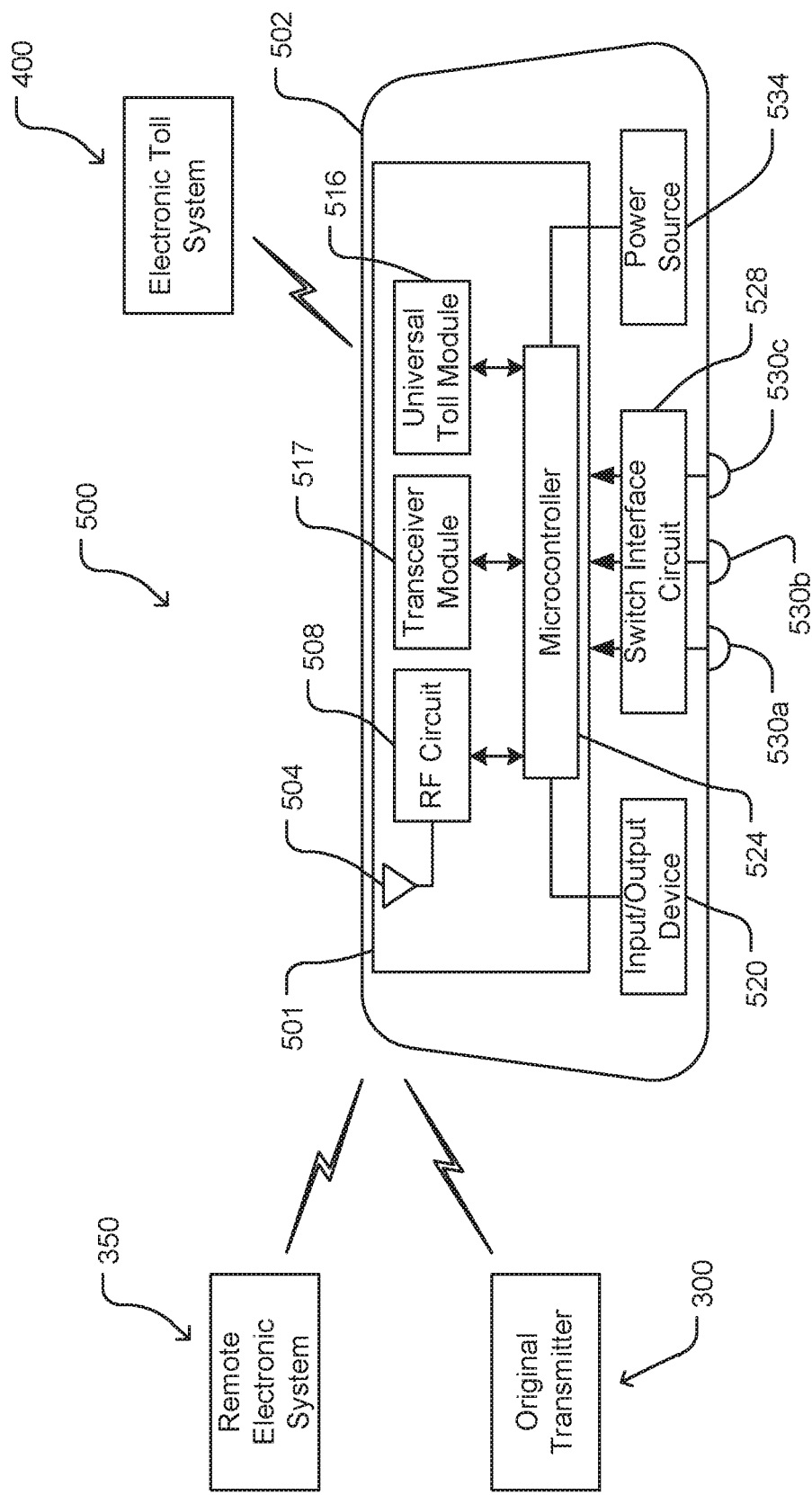
FIG. 3 is a schematic diagram of a rear view mirror assembly including a universal toll module for communicating with electronic toll systems, according to an exemplary embodiment.

Referring now to FIG. 3, a schematic diagram of a rear view mirror assembly 500 is shown. The rear view mirror assembly 500 can include components similar to the vehicle wireless control system 200 described herein and shown in FIG. 2. The rear view mirror assembly 500 and/or a housing 502 attaching the rear view mirror 500 to the headliner, windshield, or other portion of the vehicle 100 can include one or more components of the vehicle wireless control system 200. For example, the rear view mirror assembly 500 can include a communication device 501 that is similar or identical to the communication device 210. For example, a universal toll module 516 can be similar or identical to the universal toll module 230, and a transceiver module 517 can be similar or identical to the transceiver module 211. The rear view mirror assembly 500 can communicate wirelessly with remote devices such as the remote electronic system 350, the original transmitter 300, and the electronic toll system 400. The rear view mirror assembly 500 can include a mirror configured to reflect light in an interior of the vehicle 100. The mirror can include a display (e.g., input/output device 520) configured to output status information.

The rear view mirror assembly 500 can include an RF circuit 508 that communicates (e.g., by sending and/or receiving signals via antenna 504) with remote devices. The RF circuit 508 can perform similar functions as the transceiver circuits 216, 236 described herein with reference to FIG. 2. For example, the RF circuit 508 can transmit activation signals to the remote electronic system 350, and can transmit toll signals to the electronic toll system 400.

The rear view mirror assembly 500 can include a microcontroller 524 (e.g., a control circuit which can include memory similar to memory 212 and/or memory 232). The microcontroller 524 can be configured to format activation signals based on control information associated with the remote electronic system 350, and can be configured to format toll signals based on electronic toll codes (e.g., electronic toll codes stored in the universal toll module 516).

The rear view mirror assembly 500 can include a switch interface circuit 528 and user input devices 530a-530c. The switch interface circuit 528 can transmit user inputs received at the user input devices 530a-530c to the microcontroller 524. For example, various combinations of single or multiple user inputs can correspond to various instructions for actions to be performed by the rear view mirror assembly 500, such as for transmitting a signal to cause a garage door opener to open a garage door, or for transmitting a toll signal to the electronic toll system 400.

In some embodiments, the rear view mirror assembly 500 includes an input/output device 520, such as a display embedded in the rear view mirror. The microcontroller 528 can cause information regarding the operation of the rear view mirror assembly to be displayed on the input/output device 520. For example, the microcontroller 528 can cause a serial number of the universal toll module 518 to be displayed; the microcontroller 528. The input/output device 520 can include or be an audio output device, such as for outputting an indication of transmission of a toll signal or a status of authorization of the vehicle 100 by the electronic toll system 400. The microcontroller can receive input from the input/output device 420. The rear view mirror assembly 500 can be powered by a power source 534 such as a battery, connection to a vehicle power system, and/or other power source. In some embodiments, the universal toll module 516 is powered by an output signal from the electronic toll system 400. In some embodiments, the universal toll module 516 is at least partially powered by the power source 534. For example, the universal toll module 516 can receive the output signal, and use the energy from the output signal to establish a power connection to the power source 534, in order to use energy from the power source 534 to transmit a toll signal. The universal toll module 516 can include a dedicated power connection to the power source 534.

In some embodiments, the universal toll module 516 is configured, sized, and/or positioned in the rear view mirror assembly 500 to minimize interference with other components of the rear view mirror assembly 500 or with structures of the vehicle 100. For example, the universal toll module 516 can be configured to transmit toll signals within frequency ranges that do not interfere with frequency ranges associated with operation of or transmission of signals by other components, such as the RF circuit 508. The universal toll module 516 can be configured to transmit toll signals within frequency ranges associated with or required by the electronic toll system 400, and can be positioned or oriented within the rear view mirror assembly 500 so as to reduce or minimize interference with other components of the rear view mirror assembly 500.

Figure 4:
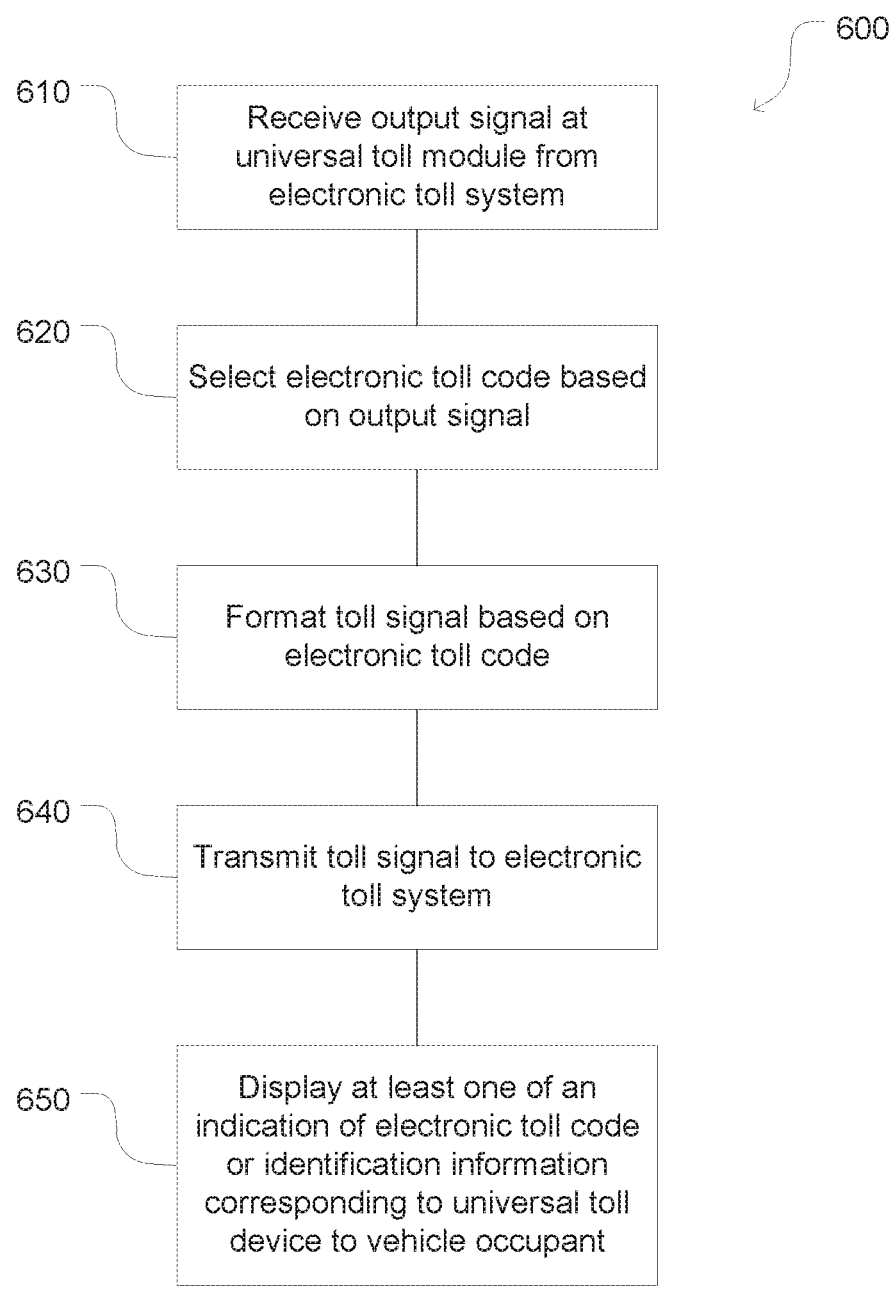
FIG. 4 is a flow diagram of a method of transmitting toll signals to an electronic toll system, according to an exemplary embodiment.

Referring now to FIG. 4, a method 600 of transmitting a toll signal to an electronic toll system is shown. The method can be performed using various components described herein, such as the communication device 210 described with reference to FIG. 2, or the rear view mirror assembly 500 described with reference to FIG. 3.

At 610, an output signal is received at a universal toll module from an electronic toll system. For example, the output signal can indicate identification information of the electronic toll system. In some embodiments, the universal toll module is powered by the output signal. For example, the universal toll module can use power from the output signal to retrieve information from memory, generate or format wireless signals, and transmit wireless signals.

At 620, an electronic toll code is selected based on the output signal. In some embodiments, the universal toll module can extract identification information from the output signal, and perform a lookup in a database of electronic toll codes to retrieve the electronic toll code corresponding to the electronic toll system based on the identification information. In some embodiments, the output signal does not identify the electronic toll system; instead, the universal toll module can automatically select the electronic toll code in response to receiving the output signal (e.g., the universal toll module can store a single electronic toll code, or the universal toll module can select the electronic toll code based on information received separately from the output signal, such as location information indicating proximity to a particular electronic toll system).

At 630, a toll signal can be formatted based on the electronic toll code. For example, the universal toll module can format the toll signal to include the electronic toll code in a format expected for reception by the electronic toll system (or a receiving device thereof).

At 640, the toll signal is transmitted to the electronic toll system. The toll signal can be transmitted by a transmitter or transceiver circuit of the universal toll module. In some embodiments, the toll signal is transmitted by a transceiver circuit separate from the universal toll module, such as a transceiver circuit that is part of a transceiver module generally configured to transmit control signals or activations signals to remote electronic systems. In some embodiments, the toll signal is transmitted at a frequency expected by or corresponding to the electronic toll system. The frequency can be stored in the universal toll module (e.g., stored in a database associating transmission frequencies with electronic toll systems). In some embodiments, the toll signal is transmitted at a frequency selected to reduce or minimize interference with other vehicle components, such as other antennas or electronics positioned in proximity to the device transmitting the toll signal. As various electronic toll systems may operate in different geographical regions from one another and may communicate in different protocols with either passive or active electronic toll tags at the same frequency (e.g., 915 MHz), interference between RF signals may occur if multiple types of electronic toll tags are present in the vehicle. In this manner, with the universal toll module selectively formatting and transmitting the toll signal based on the signal from the electronic toll system, such interference among RF signals that would have occurred with the presence of multiple electronic toll tags may be eliminated. In addition, the universal toll module may properly operate over the different geographical regions with the various electronic toll systems.

At 650, at least one of an indication of the electronic toll code or identification information corresponding to the communication device is displayed to a vehicle occupant. For example, a user interface (e.g., display, touchscreen display, etc.) in an interior of the vehicle can display the information. The displayed information can be a serial code or subserial code of the universal toll module, indicating to the vehicle occupant that the universal toll module has been used to authorize access by the electronic toll system.

In some embodiments, the method 600 includes outputting an indication to a vehicle occupant that the electronic toll system has authorized access or passage by the vehicle. For example, the user interface can visually and/or audibly output an indication of authorization.

In some embodiments, the method 600 includes requesting information regarding a number of vehicle occupants in the vehicle. For example, in response to receiving an indication from an electronic toll system that the toll system requires an indication of the number of vehicle occupants (e.g., for access to an HOT/HOV lane, for determining toll fees, etc.), the universal toll module can cause the user interface to request user input indicating the number of vehicle occupants; the user interface can also provide user input options for indicating the number of vehicle occupants independent of the indication from the electronic toll system. The universal toll module (or other transmitters of the vehicle) can format a toll signal for transmission to the electronic toll system based on the number of vehicle occupants, and transmit the toll signal.

In some embodiments, one or more steps of the method 600 can be performed in response to user input received at the user interface. For example, the user input can indicate instructions to transmit the toll signal. The user input can indicate identification information of the electronic toll system that will receive the toll signal. The user input can indicate instructions for a different transceiver circuit than a transceiver circuit of the universal toll module to transmit the toll signal, such as if the toll signal transmitted by the universal toll module failed to cause the electronic toll system to authorize access or passage. The user input can indicate a request for a serial number of the universal toll module to be displayed. In some embodiments, the user input indicates a number of vehicle occupants.

Advantageously, the vehicle wireless control system may be installed quickly and easily into an existing vehicle (e.g. as part of a vehicle upgrade or retrofit) without requiring extensive integration with the existing vehicle system. For example, the vehicle wireless control system or components thereof (e.g., the communication device) may be a stand-alone device capable of independent and self-sufficient operation without relying on input from a vehicle subsystem or energy from the main vehicle battery. The vehicle wireless control system can include all the necessary processing electronics for learning, storing, and retransmitting a control signal or a toll signal. The vehicle wireless control system can further include a battery (e.g., separate from the main vehicle battery) used to power only the vehicle wireless control system.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system disposed in a rearview mirror housing for a vehicle, the system comprising:
    a communication device disposed on a printed circuit board and communicatively coupled to a vehicle bus of the vehicle, the communication device comprising a universal toll module that is configured to transmit a toll signal via a radio frequency transmission, the radio frequency comprising at least one electronic toll code to an electronic toll system, wherein the communication device is configured to receive location information identifying a location of the vehicle from a location device and select the at least one electronic toll code for communication with the electronic toll system based on the location, wherein the at least one electronic toll code comprises a coded authorization of a toll payment identified based on the location;
    a transceiver module disposed on the printed circuit board and configured to transmit an activation signal to control operation of a remote electronic system, wherein the transceiver module includes a control circuit configured to extract control information from a control signal for controlling the remote electronic system received by the transceiver module from a transmitter, format the activation signal based on the control information, and cause the transceiver module to transmit the activation signal to the remote electronic system;
    a user interface communicatively coupled to the vehicle bus, the user interface configured to display at least one of an indication of the at least one electronic toll code or identification information corresponding to the communication device and prompt an input identifying a number of occupants in response to a request of the number of occupants received from the electronic toll system; and
    wherein the communication device is configured to receive the request of the number of occupants in the vehicle and communicate the number of occupants to the electronic toll system in response to the input to the user interface identifying the number of occupants.

2. The system of claim 1, wherein the user interface further comprises a user input device configured to receive user input.

3. The system of claim 2, wherein the communication device is configured to receive from the user input device the user input indicating at least one of the at least one electronic toll code and/or the electronic toll system.

4. The system of claim 2, wherein the communication device is configured to select the at least one electronic toll code based on the user input.

5. A communication device for a vehicle, comprising:
    a transceiver module configured to transmit a wireless signal to control operation of a remote electronic system;
    a universal toll module configured to transmit a toll signal comprising at least one electronic toll code to an electronic toll system, wherein the universal toll module is configured to receive an output signal from the electronic toll system and transmit a toll signal containing the at least one electronic toll code corresponding to the electronic toll system in response to receiving the output signal, and wherein the universal toll module is configured to receive location information identifying a location of the vehicle from a location device and select a toll code for communication with the electronic toll system based on the location;
    wherein both the transceiver module and the universal toll module are mounted on a printed circuit board;
    a rear view mirror housing enclosing the printed circuit board on which the transceiver module and the universal toll module are mounted;
    a user interface in communication with the printed circuit board and in connection with the rearview mirror and configured to prompt an input identifying a number of occupants in response to a request of the number of occupants received from the electronic toll system; and
    wherein the universal toll module is configured to receive the request of the number of occupants in the vehicle and communicate the number of occupants to the electronic toll system in the toll signal in response to the input to the user interface identifying the number of occupants.

6. The communication device of claim 5, further comprising a rear view mirror housing enclosing the transceiver module and the universal toll module.

7. The communication device of claim 6, further comprising a mirror disposed in the rear view mirror housing and a display positioned in the mirror, the display configured to output status information.

8. The communication device of claim 5, wherein the at least one electronic toll code comprises a coded authorization of a toll payment for a user based on the location.

\* \* \* \* \*